United States Patent [19]
Van Der Kooy

[11] Patent Number: 5,682,974
[45] Date of Patent: Nov. 4, 1997

[54] TRANSPORTER COMPRISING AN ENDLESS BELT AND A METHOD FOR TRANSPORTING MATERIAL FROM A FIRST TO A SECOND LOCATION

[75] Inventor: Leendert Pieter Dirk Van Der Kooy, Meer, Belgium

[73] Assignee: Barrages Services International B.V., Raamsdonksveer, Netherlands

[21] Appl. No.: 443,608

[22] Filed: May 18, 1995

[30] Foreign Application Priority Data

May 18, 1994 [NL] Netherlands .............................. 9400819

[51] Int. Cl.⁶ .................................................. B65G 15/08
[52] U.S. Cl. ........................................ 198/819; 198/818
[58] Field of Search ..................................... 198/819, 820, 198/821, 817, 818, 823, 808, 686, 624

[56] References Cited

U.S. PATENT DOCUMENTS

| | | | |
|---|---|---|---|
| 2,928,525 | 3/1960 | Schaeffer | 198/819 |
| 3,324,806 | 6/1967 | Olsen | 105/150 |
| 3,533,499 | 10/1970 | Harkess | 198/819 X |
| 3,595,378 | 7/1971 | Kamisaka | 198/819 |
| 3,627,595 | 12/1971 | Leach | 198/686 X |
| 4,557,373 | 12/1985 | Paurat et al. | 198/819 |

FOREIGN PATENT DOCUMENTS

| | | | |
|---|---|---|---|
| 4036731 | 4/1991 | Germany | B65G 17/04 |
| 0185710 | 8/1988 | Japan | 198/818 |
| 0372863 | 5/1932 | United Kingdom | 198/820 |
| 0733714 | 7/1955 | United Kingdom | 198/818 |
| 970253 | 6/1961 | United Kingdom . | |
| 2195968 | 4/1988 | United Kingdom | B65G 15/08 |

*Primary Examiner*—James R. Bidwell
*Attorney, Agent, or Firm*—Webb Ziesenheim Bruening Logsdon Orkin & Hanson, P.C.

[57] ABSTRACT

The invention relates to a transporter having an endless belt which is at least partially in cross section substantially U-shaped, a guiding assembly formed by at least one runner and at least one rail for guiding the belt between at least one unloading station and at least one loading station, a driving assembly which drives a transmission assembly which in turn transmits drive energy to the belt and a suspending assembly formed by at least one holder associated with the runner for suspending the belt from the guiding assembly. The transmission assembly is associated with the transporter to depend under the guiding assembly and the transmission assembly has an axis of rotation substantially parallel to a vertical axis bisecting the U-shaped cross sections of the belt.

19 Claims, 10 Drawing Sheets

TRANSPORTER COMPRISING AN ENDLESS BELT AND A METHOD FOR TRANSPORTING MATERIAL FROM A FIRST TO A SECOND LOCATION

BACKGROUND OF THE INVENTION

1. Field of the Invention

The supply of material such as powder like material but also, for example, completely or partially fluid concrete, sediment and/or debris/bulk goods of any composition to or from a demolition/building site and dredged slurry from one place to a removal location is important for a continuous carrying out, or indeed allowing carrying out, of these activities.

2. Description of the Prior Art

Presently the supply of material to and from work places, is mainly carried out by the loading thereof onto wagons and suchlike, whereafter the material is transported to the desired location and subsequently unloaded. This work is time consuming, inefficient, expensive and/or requires many man hours.

Transporters, comprising endless belts for transporting material from one location to another, are also known, for example from the German Patentschrift DE 3 632 121 (Paurat), the U.S. Pat. No. 3,324,806 (Olson) and the German Offenlegungsschrift DE 4,036,731 (Gockel).

However a problem with these known transporters is that is high stress build up in the endless belt.

An object of the present invention is to provide a transporter comprising an endless belt, wherein relatively little stress builds up.

SUMMARY OF THE INVENTION

According to the present invention there is provided a transporter comprising:
- an endless belt, which is at least partially in cross section, substantially U-shaped;
- guiding means formed by at least one runner and at least one rail for guiding the belt between at least one unloading station and at least one loading station;
- driving means which drive transmission means which in tun transmit drive energy to the belt;
- suspending means, formed by at least one holder associated with the runner, for suspending the belt from the guiding means; wherein the transmission means are associated with the transporter to depend under the guiding means and wherein said transmission means have an axis of rotation substantially parallel to a vertical axis bisecting the U-shaped cross sections of the belt.

This arrangement imparts relatively little stress to the belt, especially in the longitudinal direction, whereby a maximum bearing force can be held over for taking up bearing stress in the vertical direction.

Since relatively little stress, especially in the longitudinal direction is built up in the belt, no great pulling/pushing forces are exerted on the transporter, particularly the supports, whereby these have to be strengthened, often by increasing their weight and embedding into the ground to yield reinforced foundations, in order for the transporter to function effectively.

Hence the transporter according to the present invention can be realized relatively light weight and the need for substantial, reinforced foundations for the transporter is obviated, thus yielding the advantages of facility of moving the transporter to a required working location, facility of assembly/disassembly of the transporter and cost efficiency.

The transporter is especially advantageous for difficult to access location such as reservoirs which are being dredged.

The present invention further provides a method for transporting material from a first to a second location.

BRIEF DESCRIPTION OF THE DRAWINGS

Further characteristics, advantages and details of the present invention will become clear from the following description which refers to the accompanying figures, which show.

DESCRIPTION OF THE PREFERRED EMBODIMENTS

The transporter 1 (FIG. 1) comprises an endless belt 2, with a loaded length 9 and an empty length 4.

Figure 1:
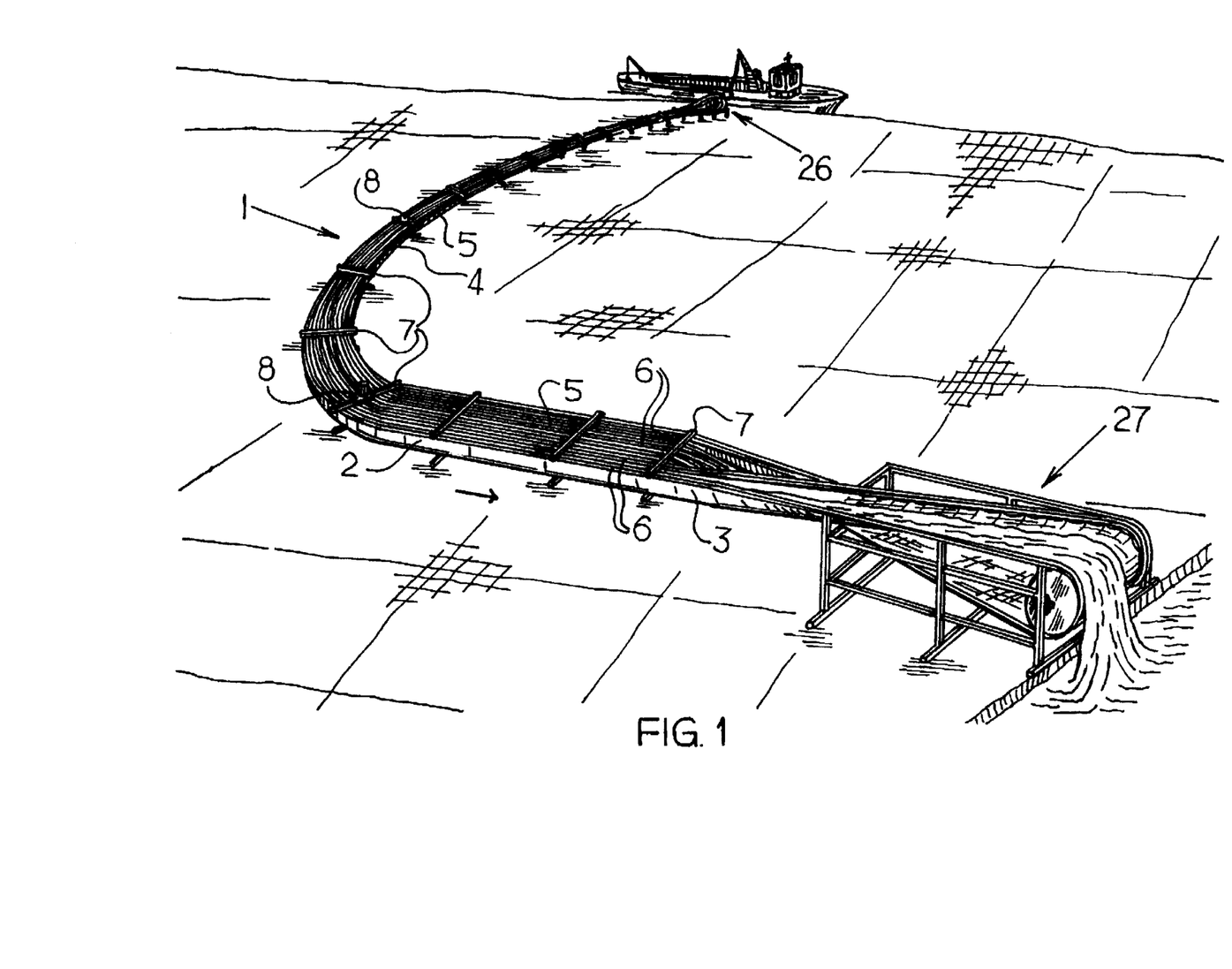
FIG. 1 a perspective view of an embodiment of the transporter according to the present invention, when this transporter is in use.

The belt 2 is farmed from sections 5 which hang from rails 6, which are supported by T-shaped supports 7. The T-supports 7 are preferably reinforced on the side from which the loaded belt length 3 hangs. The sections 5 can be added and removed in order to realize a belt of desired length. The sections 5 of the present invention are preferably built to a standard length of six and twelve meters. Predetermined, farmed sections of a desired length can be added along the belt at any position, for example when the belt has to turn a bend. Likewise, any section of belt may be removed if desired.

The sections 5 are preferably made from a sturdy or reinforced material, such as canvas.

The endless belt 2 is driven along the rails 6 by driving systems 8. These driving systems 8 are supported by the T-supports 7 and comprise one or more in preference electric motors 9, mutually coupled transmission means 10 and a cover 11 for the system 8. (See FIGS. 2 and 3).

Each motor 9, drives the mutually coupled transmission means 10 (FIGS. 2 and 3) which are divided into first transmission wheels 12 and second transmission wheels 13 wherein the energy from the motor 9 is transmitted through the first transmission wheels 12 and drives axles 14, to the second transmission wheels 13 (see FIG. 3), so that the second transmission wheels 13 interlockably couple with a double toothed rack-rail 15 mounted on the belt 2 in order to simultaneously and to the same extent drive the belt 2 in opposite directions.

Figure 3:
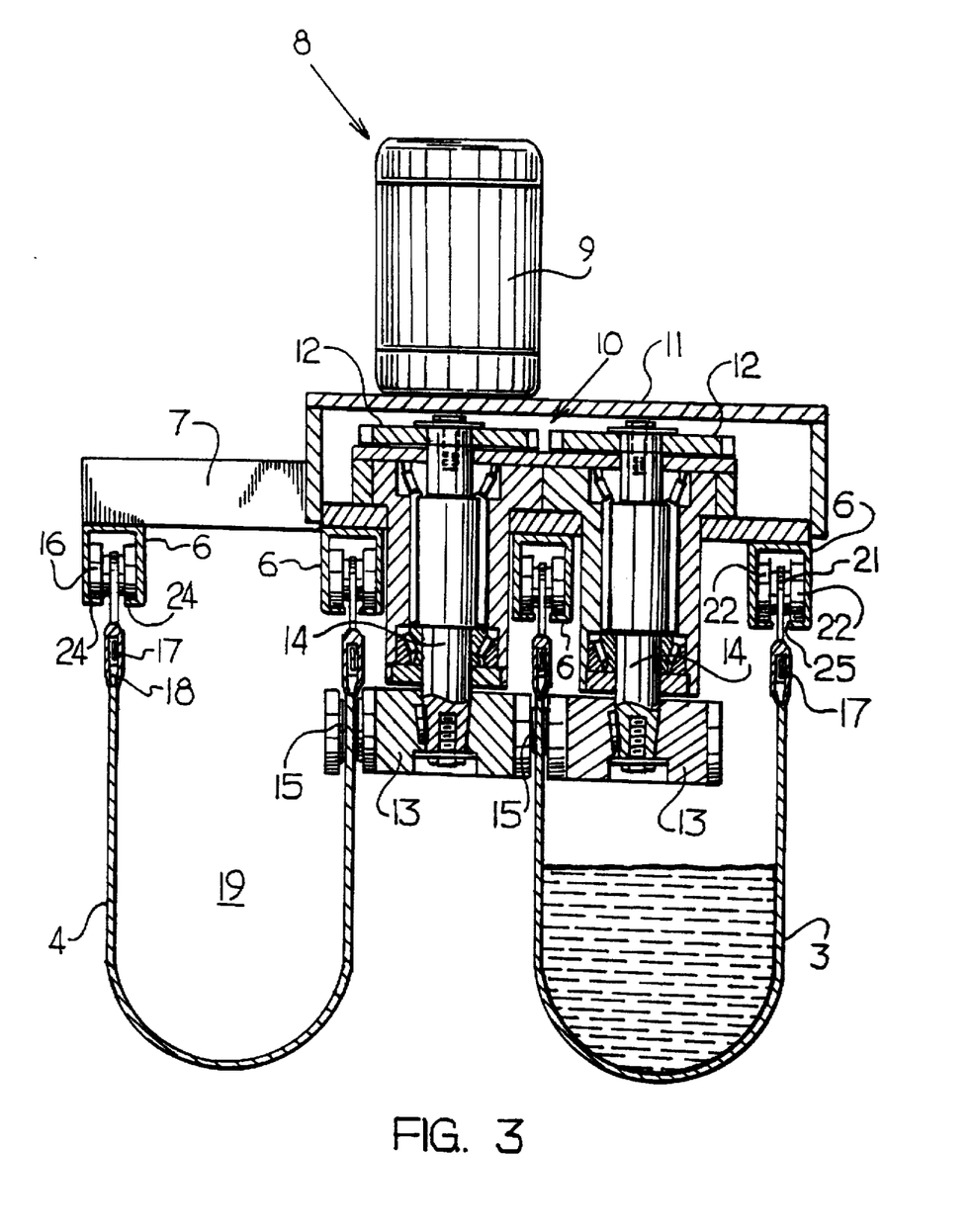
FIG. 3 a cross section of a driving system of the transporter from FIG. 1.

The loaded length 3 of the belt 2 is interlockably driven along the rails 6, between the second transmission wheels 13, whilst the empty length is driven along the rails 6, by being brought into contact with only one second transmission wheel 13 (FIG. 3).

Since the (not shown) teeth of the lower transmission wheels 13 are interlocked with the rack-rail 15 of the belt 2, both the loaded length 3 and the empty length 4 of the belt 2, can be driven along the rails 6 with a great deal of control.

Figure 2:
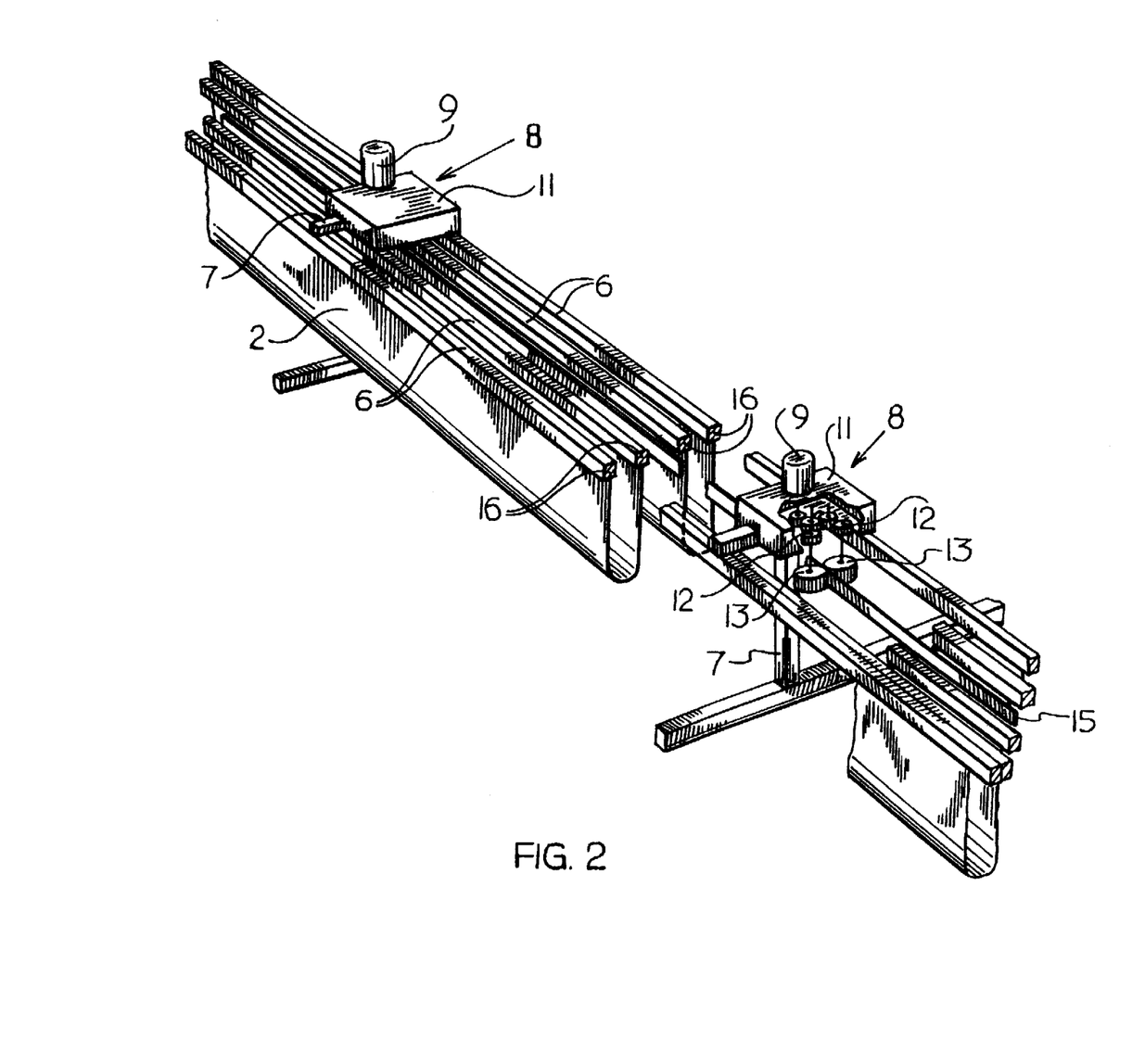
FIG. 2 a partially broken away perspective view of the transporter from FIG. 1.

The belt 2 is suspended from runners or trolleys 16, which run in the rails 6 (see FIGS. 2, 3, and 4) by means of projections 17 arranged on the belt 2 which are secured to a closed hook 18, mounted on the runners 16 in order to yield the U-shaped in cross section belt areas 19 (FIGS. 2 and 3). Each runner comprises a frame 21 and four running wheels 22 wherein the frame 21 is provided with an opening 20, wherein the closed hook 18 is suspended.

Figure 4:
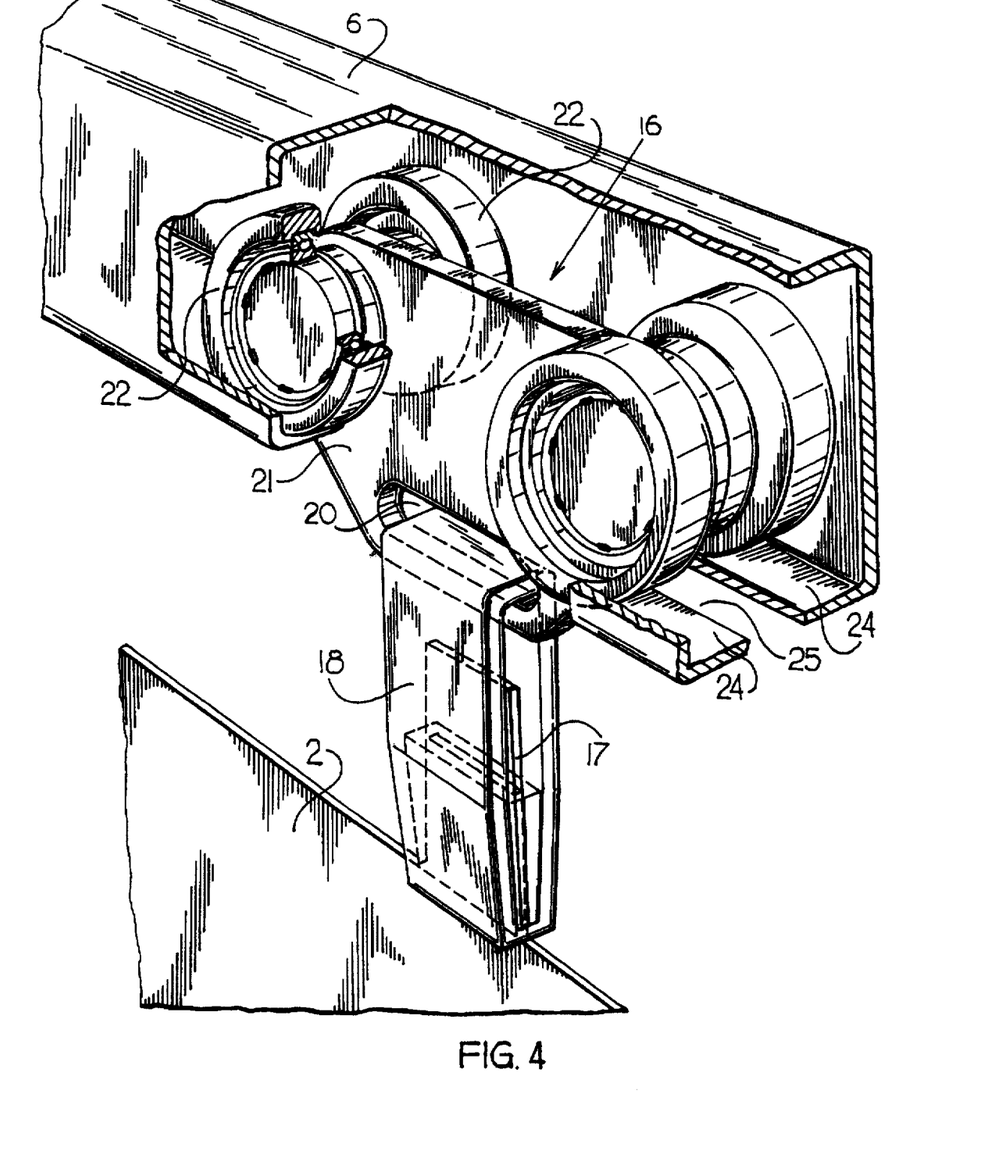
FIG. 4 a partially broken away perspective view of a runner of the transporter from FIG. 1.

In use, the running wheels 22 run along the lanes 24 of the rails 6, whilst the frame 21 of the runners 16 is guided by the channel 25 between the lanes 34.

Since there is a low resistance present during guiding of the runners along the rails, the driving power can be low whereby a cost saving, efficient transporter is obtained.

The belt is reversed at the loading station 26 and he unloading station 27 (FIGS. 1 and 5) so that material can be loaded into and tipped out of the belt. Near these stations the alignment of the rails 6 is changed so that the rails 6 are bent roughly 90° inwards and simultaneously are moved apart from one another, so that the belt is now substantially flat and stretched out and around a revolving drum 28 (see FIGS. 5). The rails 6 loop around the running drum 28 before the rails are bent back in by roughly 90° and brought together so that the belt 3 again hangs beneath the rails 6.

Figure 5:
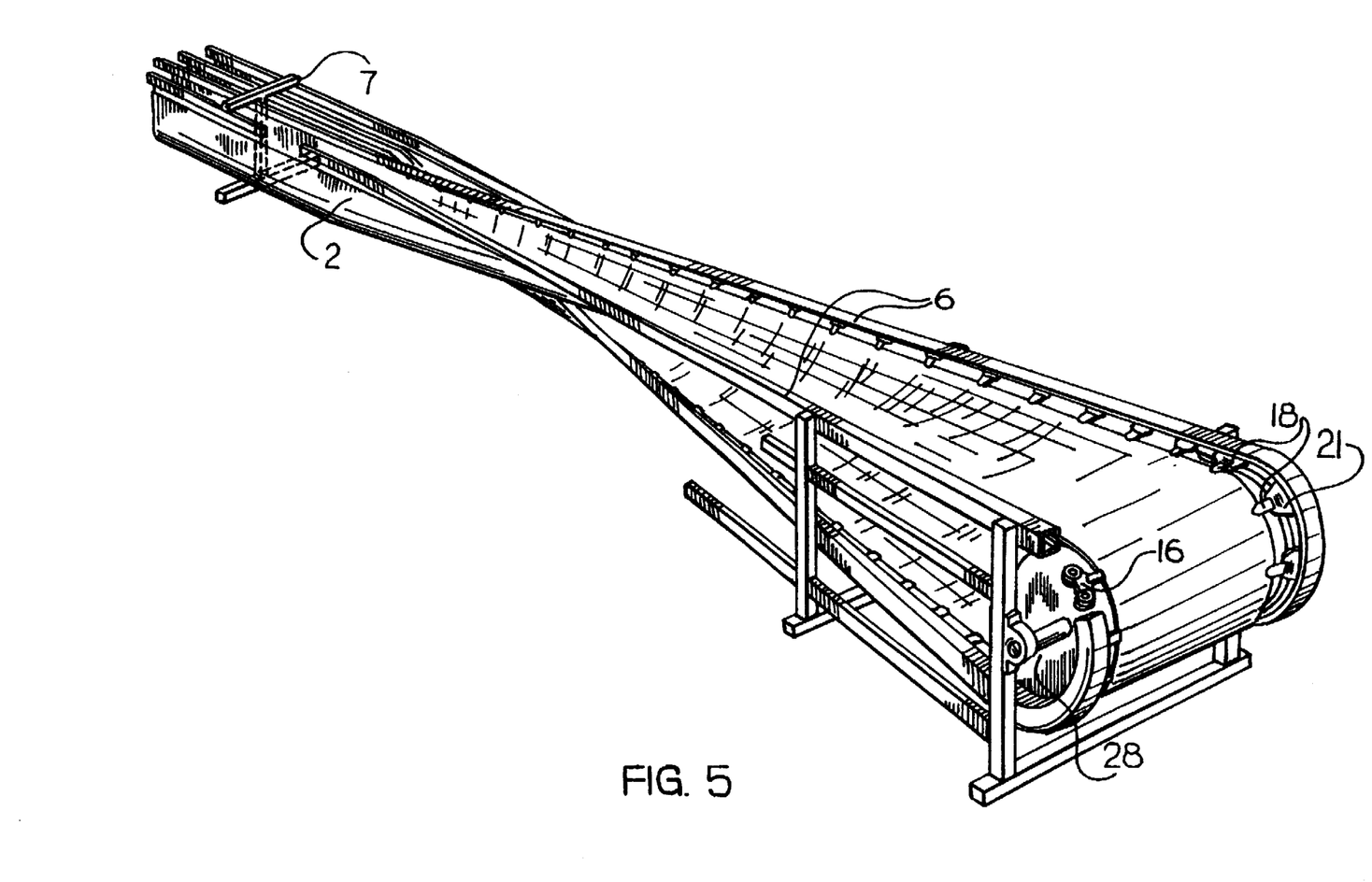
FIG. 5 a perspective view of a leading or unloading station of the transporter from FIG. 1.

It will be clear that material in the belt will be unloaded when the broadened and flattened band makes a moving loop around the running drum 28. In the same way material can be easily loaded into the belt at the loading station.

Figure 7:
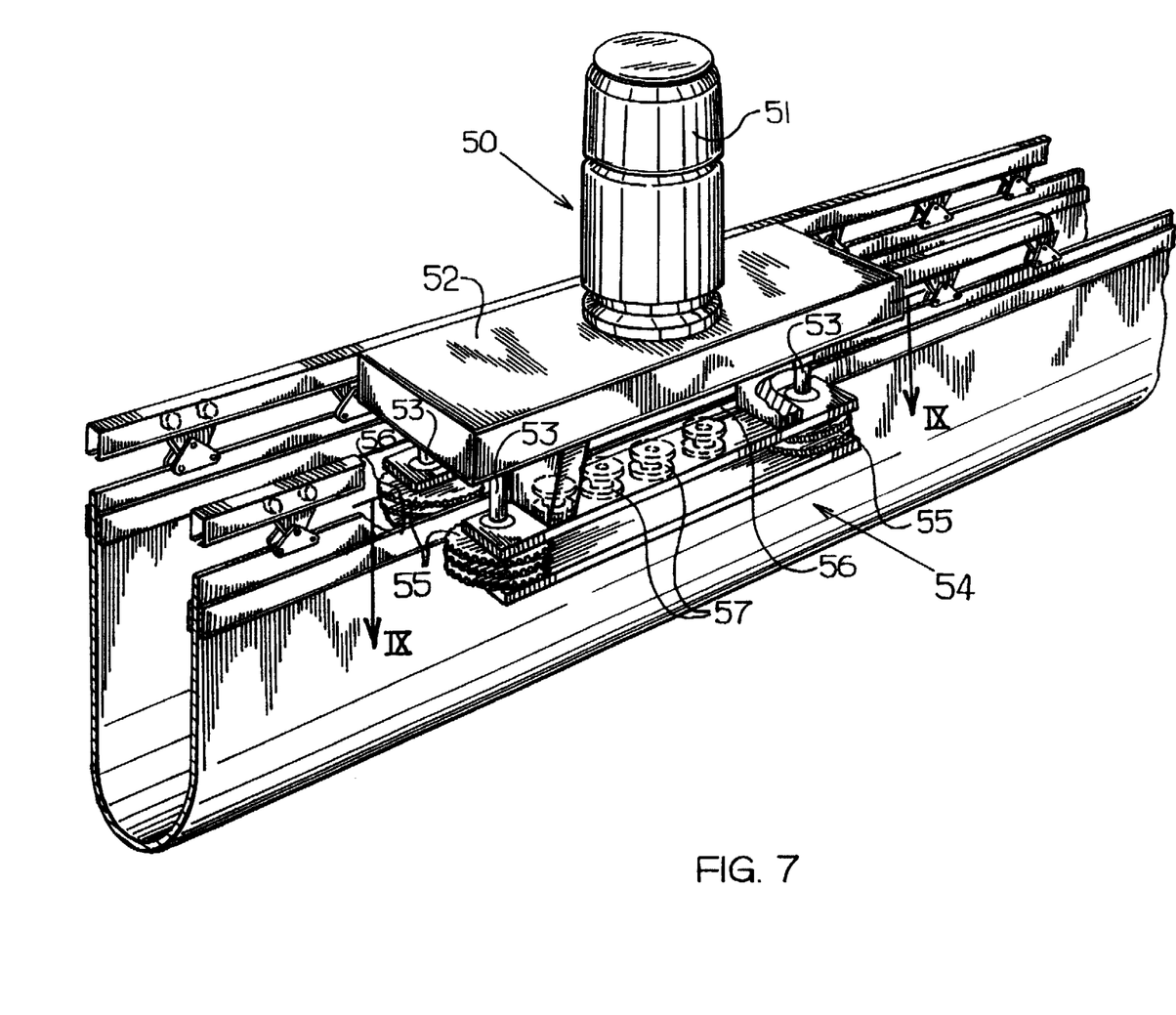
FIG. 7 a perspective, partly cut away view of a preferred drive system of the present invention.
Figure 8:
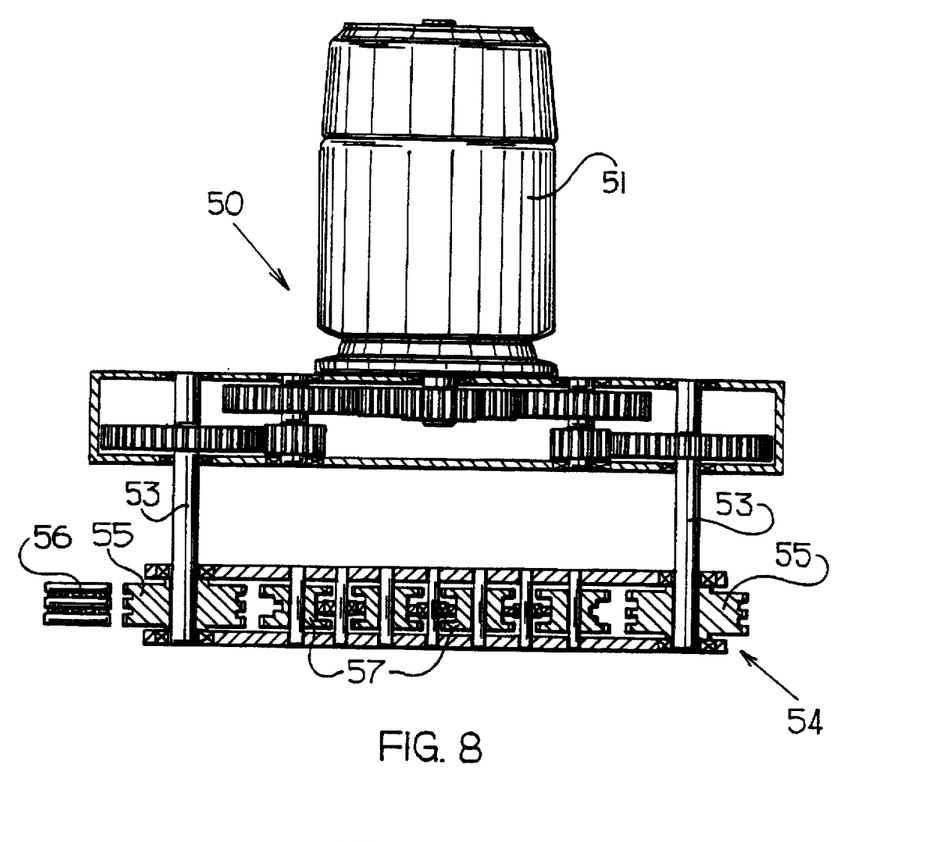
FIG. 8 a cut away side view of the drive system from FIG. 7.

A preferred drive system 50 associated with a transporter according to the present invention, is shown mounted on the transporter An FIG. 7 and in side view in FIG. 8. This drive system so comprises an electric motor 51, a housing 52 from which four drive shafts 53 depend to drive two transmission means 54 each consisting of two drive wheels 55 around which a caterpillar track 86 is driven and a number of spring rollers 57.

Figure 9:
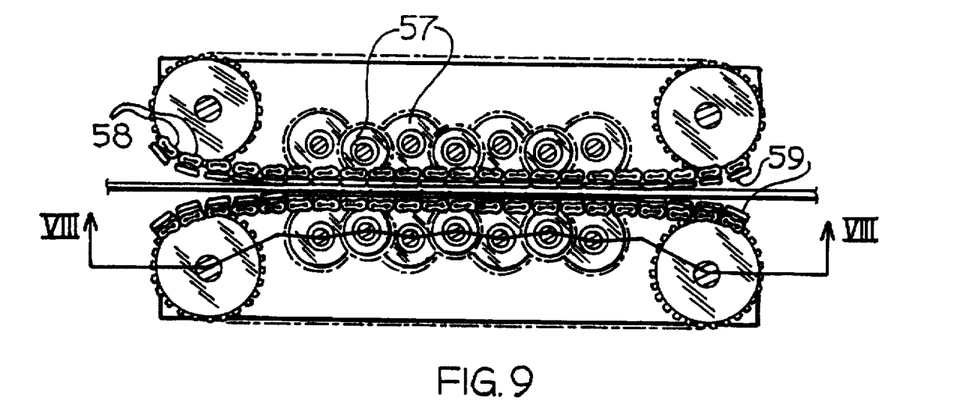
FIG. 9 an above view of the drive system from FIGS. 7 and 8.
Figure 10:
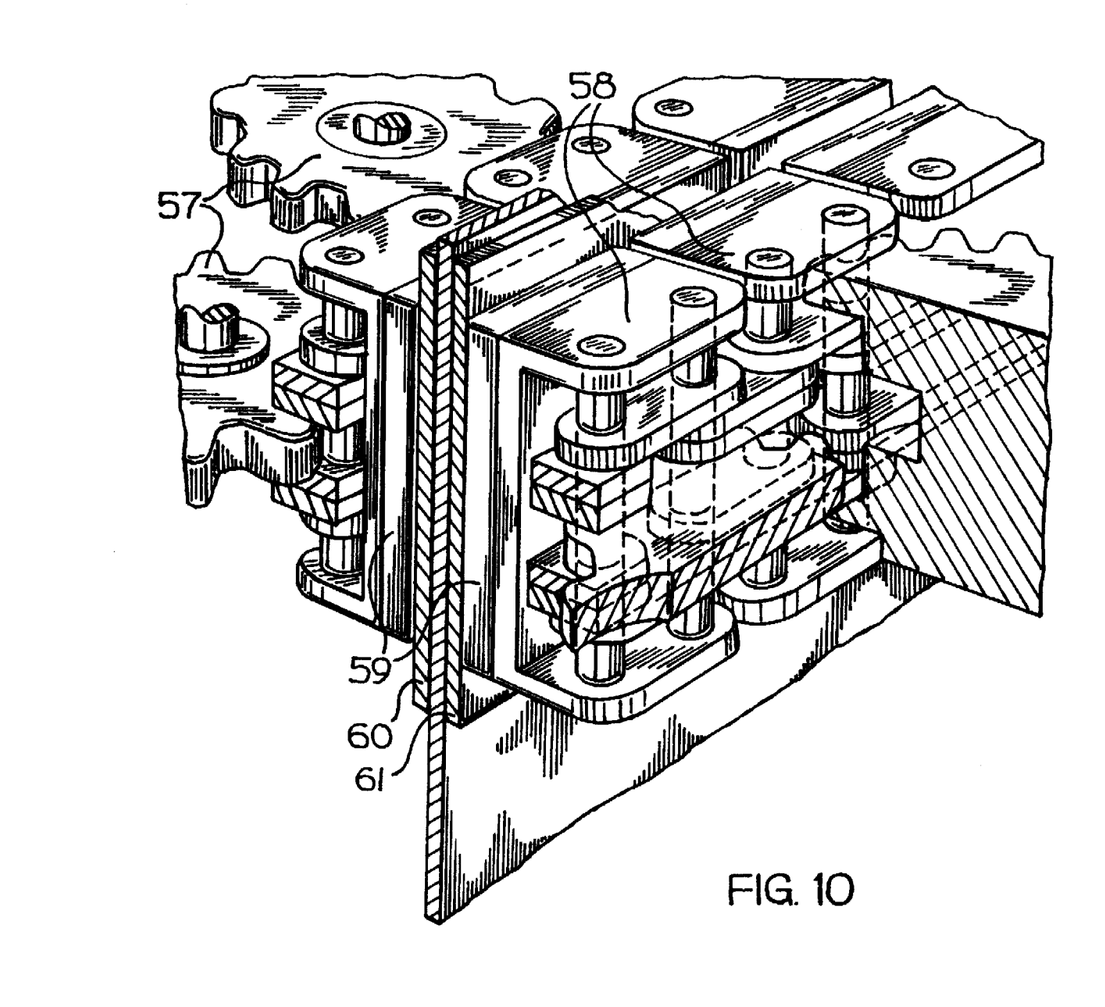
FIG. 10 a partly cut away perspective view of part of the transmission means from FIG. 7, 8 and 9.

The caterpillar track 56 comprises links 58 on which are preferably mounted plates of high friction material 59 which grip against continuous lengths 60, 61 of high friction material on the belt (see FIGS. 9 and 10).

In use, the caterpillar track 56 is driven by drive wheels 55 around the spring milers 57 (and preferably equipped with teeth, see FIGS. 10, to interlock with the caterpillar links 58), so that the section of the belt on which the high friction material is mounted is sandwiched, as it were, between opposing caterpillar tracks as shown in FIG. 9 so that the plates 59 of high friction material bite into the lengths 60, 61 of high friction material in the belt thereby driving the latter (see FIGS. 7, 9 and 10).

The adjacent surfaces of the belt and the caterpillar tracks are controllable by utilization of a high grade friction material, for the friction plates and friction lengths on the belt, in combination with a large gripping surface. In order to prevent the high friction plates from immediately biting into the high friction lengths, on the belt, when the former come off the drive wheels, the drive wheels are so arranged that a small angle is present at the moment of placing of the high friction plates onto the adjacent high friction belt lengths (see FIG. 9). This arrangement ensures a smooth transmission of driving energy to the belt and enables the belt to be driven with a great deal of control.

Since by utilizing this preferred embodiment of the drive system and transmission means stress in the longitudinal direction of the belt is kept especially low, the belt is able, to adopt an extremely slack form, whereby it exerts very little pushing/pulling force on the transporter, the force exerted on the transporter by the belt being mainly in the vertical direction, whereby the belt is able to be driven with a great deal of precision and controllability.

Hence belt material may be used which is relatively thin, for instance from 10 to 20 mm, thereby keeping the weight of the transporter down enabling savings to be made on running costs.

The arrangement of the caterpillar tracks 56 drive wheels 55 and spring rollers 57 transmits driving force to the belt, whilst at the same time regulating the stress/tension in the belt, i.e. the spring rollers, which are preferably made of rubber for optimum results, take up the stress/tension of the belt and aid in controlling the pulling power of the caterpillar track.

The spring resistive rollers can be pre-tensioned and adjustable in order to yield optimum transporting conditions.

Accordingly this arrangement of the transmission means enables the caterpillar track and spring rollers to take up any irregularities in the form of the belt.

As the belt is driven relatively slack, and does not need to be pre-tensioned or pre-stressed and since relatively thin sections of material can be used to form the belt; if it is desired to increase the length of the belt, a new section of belt material can be simply glued onto the next section since, as stated above, stress is mainly in the vertical direction and not in the longitudinal direction. Hence a large surface area is available for carrying of material and the addition of new belt sections is very simple.

A further advantage of this preferred embodiment is that, due to the form of the drive system and transmission means, damage resulting from driving of the belt is minimal.

The provision of electric motors means that the transporter, according to the present invention, can be easily and quickly set up near existing power lines, whereby a minimum of extra support is needed, for example from the local work force, for instance when assembling the transporter in remote locations.

The desired number of drive systems is dependent on the length of the belt and the surrounding geography such as hills, mountains and so forth. The greater the number of drive systems, the lower the stress on a particular section of the belt. If desired a drive system can be mounted anywhere along the belt, or on a T-support, and/or can be removed in order to facilitate driving of the belt.

In use, the transporter according to the present invention can transport roughly 200 kg material/m belt, at a speed of about 3.5/4 m s$^{-1}$ equivalent to roughly 2000 m$^3$ material/s$^{-1}$.

A (not shown) torque limiting clutch can be arranged between the drive motors and the transmission systems in order to prevent damage to the transporter, if problems arise, such as jamming of the belt or malfunctioning of the drive motors.

The drive systems are preferably able to not only supply drive energy but also to receive any energy generated, such as energy being generated by movement of a loaded belt section down hall. This generated electronic or hydraulic energy is in such instances preferably relayed back to drive systems requiring this energy or can be relayed back into the main power net work.

Accordingly it is possible with the transporter of the present invention to provide a belt which requires very little energy to start it or keep it running.

Figure 11:
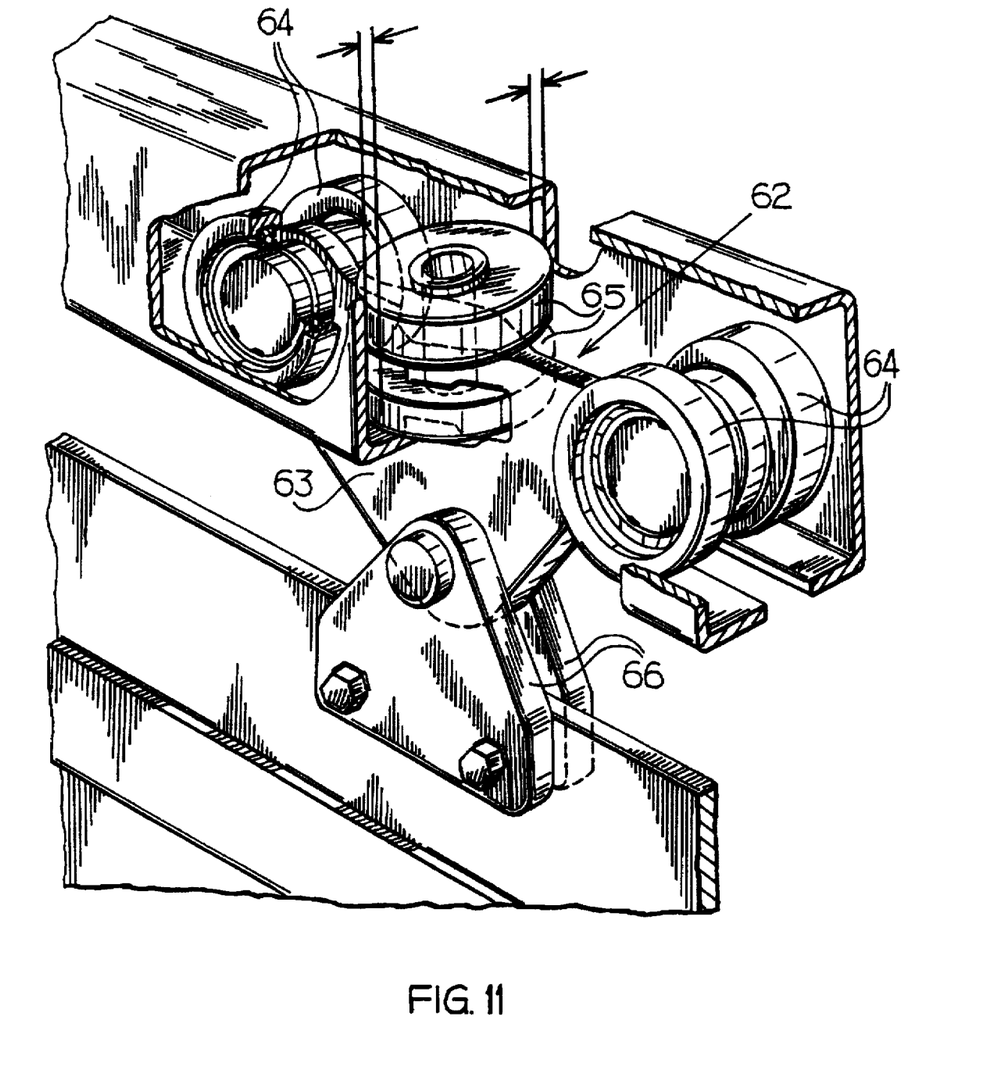
FIG. 11 a partly cut away perspective view of a preferred runner of the present invention.

A preferred runner 62, according to the present invention, is shown in FIG. 11 whereby the belt is suspended from a frame 63 on which four running wheels 64, two transverse wheels 65 and two steel plates 66 are bolted to the underside of the frame 61 where between the belt is secured.

The running wheels 64 take up the load in the vertical direction whilst the two transverse wheels 65 enable the runner 62 to take bends without tipping over. Hence the belt ie suspended in a runner which is stabilized in both the vertical and horizontal directions.

In order to ensure optimum running of the runners on the rails, the distance between the lanes may be predetermined, i.e. increased or decreased at certain positions along the transporter, for instance narrowed in order for tight bends to be taken with a maximum of ease.

Hence the transporter according to the present invention can be assembled to follow the local geography very closely, whereby a saving on material is also yielded by not having to encompass long bends in the rails in order for the transporter to change direction.

Suspending the belt from rails via a runner and the steel plates, ensures that the belt can move freely between the rails without getting caught up in the latter.

The design of the runner and rails, ensures an optimum transportation of material whereby the belt can easily be cleaned and repaired, for example, and whereby if the belt becomes detached from the runner, the former is easily able to be put back since the belt is not taut.

Due to the form of the rails and supports and since they relatively light weight effected, they can be easily stacked up for storage and/or transportation for instance.

According to a further embodiment of the present invention, material can be tipped out of a belt 30 (FIG. 6) by reversing supports 31.

Figure 6:
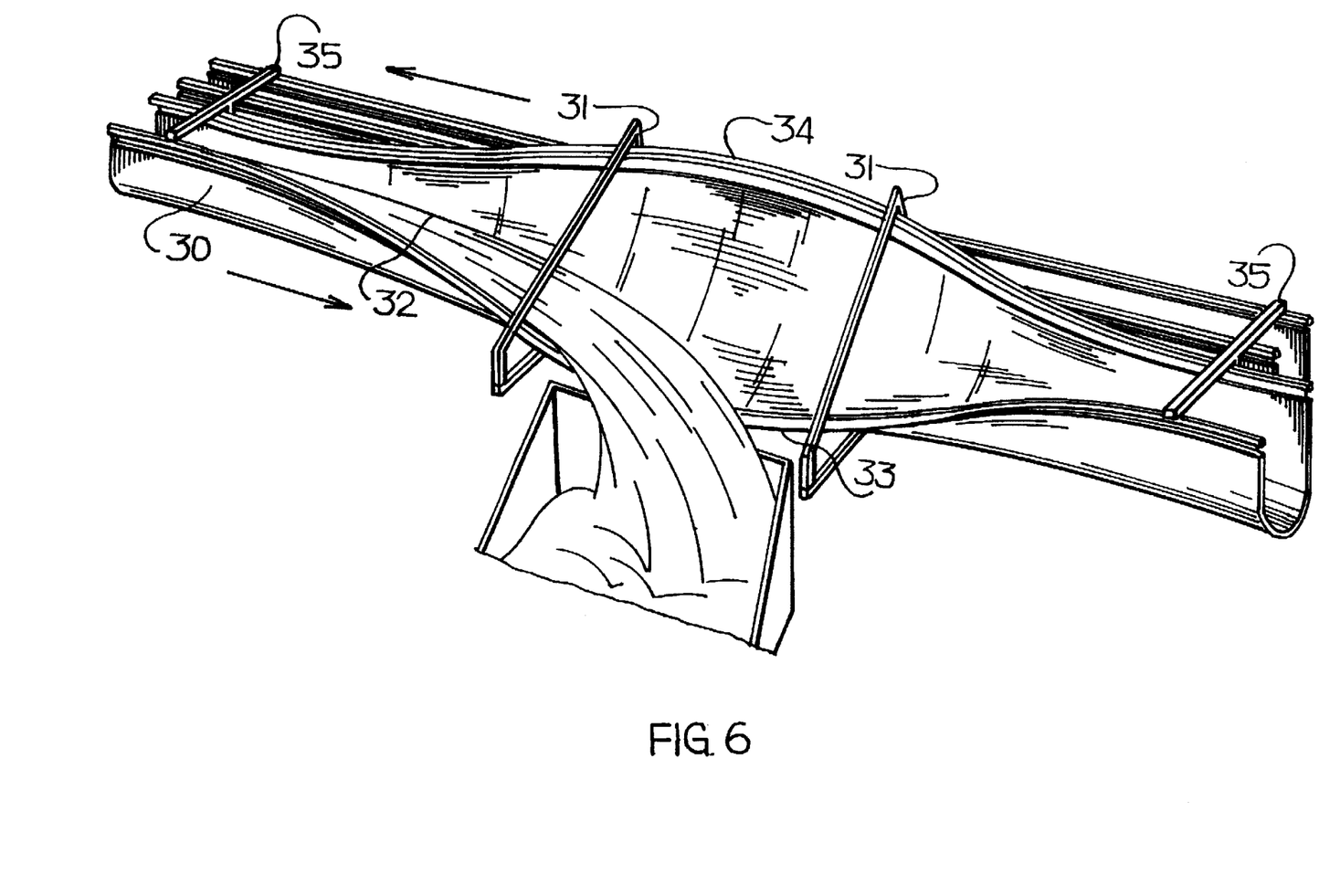
FIG. 6 an embodiment of one reversing system of the transporter from FIG. 1.

The rail sections 33, 34 hang between and under two reversing supports 31. The inner rail section 34 is supported at a greater height by the reversing support 31 than the outer rail section 33 wherein the reversing supports 31 also support the inner and outer rails 33, 34 respectively at a greater distance from each other than is the case with the T-supports 35. Accordingly the U-shaped in cross section belt length 32 is broadened and tilted between the reversing supports 31 when the band 30 is driven along the rails 33, 34 so that the material is tipped out of the belt between the reversing supports 31. This embodiment of the invention yields the advantage that material can be loaded or unloaded at any position along the belt, which means that the material does not have to remain in the belt until the point Where the belt is reversed around a running drum.

In use, material is loaded onto a continuously moving endless belt a at the loading station 26. The material is then transported within the loaded length 3 of the supply belt 2 to the unloading station 27. Here, the continuously moving endless supply belt 3 is effectively turned inside out in order to unload its contents whereafter the subsequent empty length 4 of the supply belt 2 is driven back to the unloading station 26, so that the complete loading and unloading process can be repeated.

The requested rights ere not determined by the above described exemplary embodiments, for instance a transporter according to the present invention can be used for transporting material above water, but are rather determined by the following claims.

I claim:

1. A transporter for transporting material between at least one loading station and at least one unloading station, comprising:

an endless belt having sides and which is at least partially in cross section substantially U-shaped;

guiding means formed by at least one runner and at least one rail for guiding the belt between the at least one unloading station and the at least one loading station;

driving means which drive transmission means which in turn transmit drive energy to the belt; and suspending means formed by at least one holder associated with the runner for suspending the belt from the guiding means, wherein the transmission means are associated with the transporter to depend under the guiding means, wherein said transmission means have an axis of rotation substantially parallel to a vertical axis bisecting the U-shaped cross section of the belt, and wherein the belt is suspended from the suspending means such that the sides of the belt in section are substantially parallel to the vertical axis bisecting the U-shaped cross section of the belt.

2. The transporter according to claim 1, wherein the transmission means comprise at least one caterpillar track which transmits drive energy to the endless belt.

3. The transporter according to claim 1, wherein the driving means include at least one electric motor mounted on the endless belt at a predetermined position.

4. The transporter according to claim 3 further comprising at least one support for supporting the endless belt between the loading station and the unloading station, wherein the support has such a form that it can support a first belt length substantially independently from a second belt length.

5. The transporter according to claim 1, wherein the runner comprises a frame on which at least one first wheel is supported.

6. The transporter according to claim 5, wherein at least one second wheel is supported by the frame, said second wheel being substantially perpendicular to the first wheel.

7. The transporter according to claim 6, wherein the endless belt is formed by a predetermined number of sections, wherein the sections can be coupled together.

8. The transporter according to claim 7, wherein the sections of the endless belt are coupled together by glue.

9. The transporter according to claim 1, further comprising reversing means in order to reverse the endless belt at at least one predetermined position along its length, wherein the reversing means are formed by at least one revolving drum.

10. The transporter according to claim 2, wherein the driving means include at least one electric motor mounted on the endless belt at a predetermined position.

11. The transporter according to claim 2, wherein the runner comprises a frame on which at least one first wheel is supported.

12. The transporter according to claim 3, wherein the runner comprises a frame on which at least one first wheel is supported.

13. The transporter according to claim 4, wherein the runner comprises a frame on which at least one first wheel is supported.

14. The transporter according to claim 2, further comprising reversing means in order to reverse the endless belt at at least one predetermined position along its length, wherein the reversing means are formed by at least one revolving drum.

15. The transporter according to claim 3, further comprising reversing means in order to reverse the endless belt at at least one predetermined position along its length, wherein the reversing means are formed by at least one revolving drum.

16. The transporter according to claim 4, further comprising reversing means in order to reverse the endless belt at at least one predetermined position along its length, wherein the reversing means are formed by at least one revolving drum.

17. The transporter according to claim 5, further comprising reversing means in order to reverse the endless belt at at least one predetermined position along its length, wherein the reversing means are formed by at least one revolving drum.

18. The transporter according to claim 8, further comprising reversing means in order to reverse the endless belt at at least one predetermined position along its length, wherein the reversing means are formed by at least one revolving drum.

19. A transporter for transporting material between a loading station and an unloading station, comprising:

at least one support;

a plurality of spaced-apart rails carried on the at least one support;

at least one trolley movable along each rail, wherein each trolley includes a frame and at least one wheel rotatably mounted on the frame;

an endless belt having opposed sides, wherein the opposed sides of the belt are attached to different trolleys such that the belt is substantially U-shaped in cross section and the sides of the belt are substantially parallel to a vertical axis bisecting the U-shaped cross section of the belt; and transmission means for moving the belt along the rails, wherein the transmission means includes a length of high friction material mounted along at least one side of the belt and at least one rotatable caterpillar track engaging the high friction material.

* * * * *